United States Patent Office 3,029,131
Patented Apr. 10, 1962

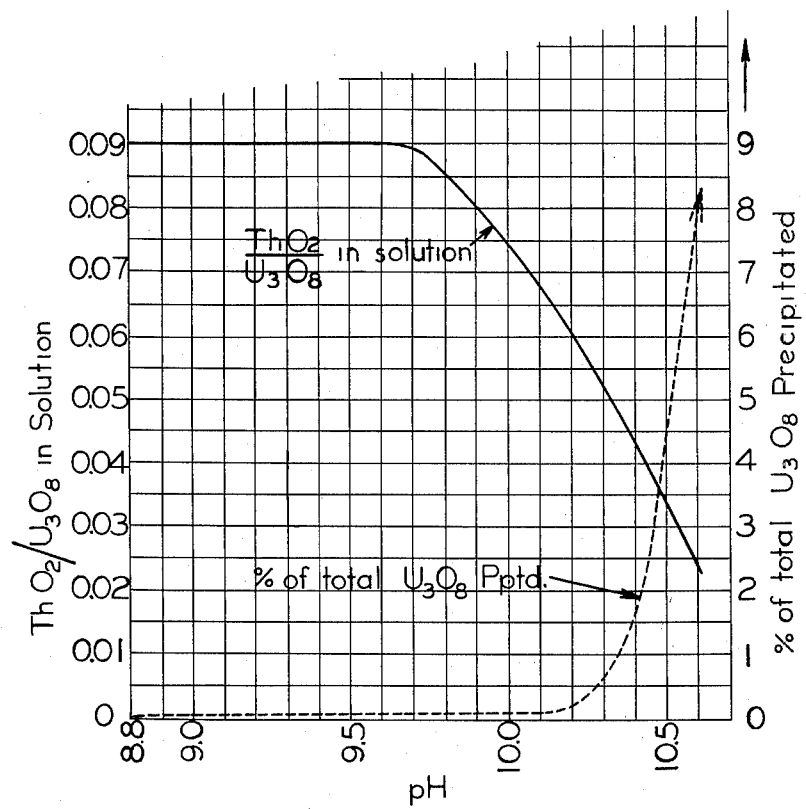

3,029,131
PROCESS FOR MUTUALLY SEPARATING URANIUM AND THORIUM VALUES
John R. Ruhoff, Webster Groves, Warren L. Towle, Kirkwood, Frank A. J. Moss, Creve Coeur, and Glenn A. Terry, Brentwood, Mo., assignors to Mallinckrodt Chemical Works, St. Louis, Mo., a corporation of Missouri
Filed Nov. 29, 1957, Ser. No. 699,720
15 Claims. (Cl. 23—14.5)

This invention relates to processes for separating metal values and more particularly to processes for mutually separating uranium and thorium values.

Briefly, this invention is directed to processes for obtaining separate concentrates of uranium and thorium values from concentrates containing substantial quantities of values of both types in admixture either in the absence or presence of rare earth values, and particularly to such processes that are capable of a high yield of uranium in the uranium concentrate. Where rare earth values are present in the concentrate, the uranium in an acidic solution comprising values of these metals is reduced to the tetravalent state and the pH of the solution is increased to separate a basic precipitate containing substantially all the uranium and a major portion of thorium. Substantially all the rare earths (as used herein, the term "rare earths" includes yttrium as well as the true rare earths) remain in solution. The pricipitate is treated with acid and an oxidant to form an acidic solution of thorium and hexavalent uranium. The method of the invention then comprises adding the aqueous acid mixture containing uranium and thorium values, substantially all of the uranium values being present in the hexavalent state (together with not more than minor proportions of phosphate and rare earth values), to an aqueous solution containing an alkali carbonate in an amount in excess of that required to convert all the uranium values to soluble alkali uranyl tricarbonate, adding an alkali hydroxide to selectively precipitate thorium values and separating the precipitated thorium values from the solution containing the uranium values. The three concentrates, containing, respectively, uranium, thorium and rare earth values, may be processed by known methods for the separate recovery of these values.

Among the several objects of this invention may be noted the provision of improved methods for attaining commercially useful mutual separation of uranium values from rare earth and/or thorium values; the provision of methods of the class mentioned which permit maximum recovery of the uranium values in the uranium concentrate; the provision of methods of the class mentioned which yield uranium concentrates substantially free from thorium and rare earths; the provision of methods of the class mentioned which require only inexpensive and readily available reagents; the provision of methods of the class mentioned which provide separate uranium, thorium and rare earth concentrates suitable for processing by known methods; the provision of methods of the class mentioned which can be carried out using conventional equipment and manufacturing techniques; and the provision of methods of the class mentioned which are economical and efficient and which are suitable for commercial manufacture. Other objects and features will be in part apparent and in part pointed out hereinafter.

The invention accordingly comprises the methods hereinafter described, the scope of the invention being indicated in the appended claims.

The accompanying drawing graphically illustrates certain exemplary concentration ratio interrelationships with pH in one step of the process of the present invention.

The processing of such well-known ores as pitchblende and carnotite yields uranium concentrates relatively free of values of such associated metals as thorium and rare earths, and economical methods for processing such concentrates are well known. However in certain ores, uranium is associated with substantial amounts of thorium and rare earths, particularly in certain pegmatitic minerals in which these metals are also associated with columbium, tantalum and titanium. Examples of such minerals are euxenite, polycrase, eschynite, priorite, blomstrandine, and samarskite.

The complex nature of these minerals is indicated by the composition of a representative member of the group, as shown in Table I.

TABLE I

*Typical Composition of Idaho Euxenite*

| Constituent: | Percent |
| --- | --- |
| $(Cb,Ta)_2O_5$ | 16–32 |
| $TiO_2$ | 15–27 |
| $U_3O_8$ | 5–11 |
| Rare earth oxides $(RE_2O_3)$ | 14–20 |
| $Fe_2O_3$ | 4–14 |
| $ThO_2$ | 1–4 |
| $CaO$ | 1–3 |
| $Al_2O_3$ | 1–4.5 |
| $SiO_2$ | 1–9 |
| $MnO$ | 0.5–2.5 |
| $P_2O_5$ | 0.1–3 |
| Ignition loss | 0.5–2 |

A copending U.S. patent application, Serial No. 698,333, filed November 25, 1957 now U.S. Patent 2,956,857, issued October 18, 1960, discloses a process for treating such ores to yield a concentrate containing substantially all the uranium, thorium, and rare earth values as well as other acid soluble components, substantially free of columbium, tantalum and titanium values. Heretofore, economical processes for the further separation of the uranium values from the thorium, rare earth and other values in such concentrates have not been available. However, in accordance with the present invention it has now been found that such separations may be carried out economically on a commercial scale.

In one embodiment of the process of the present invention a hot (55–60° C.) acidic solution of uranium, thorium and rare earth values is treated with iron powder until all the hexavalent uranium is reduced. A slight excess of iron powder is left in the solution. Ammonia solution is added until the pH is 4.0–4.5 and the resulting crude uranium-thorium precipitate is filtered off and washed. The filtrate contains substantially all the rare earth values together with most of the iron, calcium, magnesium, etc. that may have been present in the original concentrate. The rare earth values may be recovered by adding sodium carbonate to this filtrate to precipitate rare earth carbonates, or by other known methods.

The crude uranium-thorium cake is slurried in hot dilute hydrochloric acid and the slurry (pH 0.4–0.5; approximately 100 g. $U_3O_8/l$.) is treated with sufficient sodium chlorate to oxidize all the uranium to the hexavalent and substantially all the iron to the trivalent state.

The crude uranium-thorium solution is diluted to a uranium concentration of approximately 40 g. (expressed as $U_3O_8$) per liter, and sufficient sodium carbonate is added to the hot solution to increase the pH to 3.4–3.5. This precipitates a major portion of the thorium. The thorium slurry is added to a sodium carbonate solution of such volume and concentration as to provide a system that, after mixing, is approximately 0.075 molar with respect to sodium uranyl tricarbonate and approximately 0.4 molar with respect to sodium carbonate. This treatment precipitates rare earths, aluminum, calcium and other stray impurities. The thorium and impurities are filtered off, leaving a solution of the uranium values, which may then be recovered in high yield by known methods, for example, by adding sodium hydroxide to the carbonate solution to precipitate sodium diuranate.

Attempts to separate uranium and thorium values from rare earth values by adjustment of the pH of an acidic solution thereof derived from euxenite type ores have not been successful because at the pH values necessary to precipitate the uranium completely unduly large amounts of rare earths also precipitate. However, in accordance with the present invention it has been found that commercially useful separations of the type indicated can be made if the hexavalent uranium, which is normally present, is first reduced to the tetravalent state. At pH values of approximately 3–5, substantially all the tetravalent uranium and a major portion of the thorium may be precipitated, where as the rare earths, under the same conditions, largely remain in solution. In solutions more acid than approximately pH 3 substantial quantities of uranium and/or thorium remain in solution. On the other hand, rare earth contamination of the uranium-thorium precipitate increases appreciably as the pH rises above 5. When the uranium is reduced any ferric iron present will of course have been reduced along with it. This reduction of the iron to the ferrous state minimizes its subsequent precipitation with the uranium and thorium.

Any of various reducing agents may be used to reduce the uranium and ferric iron. Metallic iron has been found quite satisfactory for the purpose. A 100 mesh iron powder is easily weighed and handled and brings about the reduction smoothly and fairly rapidly. It is also relatively inexpensive and has the additional advantage that its dissolution adds no new components to the system, but rather it merely increases the amount of ferrous iron present therein. However, other sufficiently strong reducing agents, such as zinc or aluminum may be used if desired.

The tetravalent uranium in this system tends to be reoxidized readily in contact with air. To attain maximum precipitation of the uranium therefore, it is good practice to provide a slight excess of reducing agent and to protect the slurry from undue exposure to air until the precipitation and filtration of the uranium and thorium have been completed.

The presence of large amounts of sulfate affects the separation of uranium and thorium from rare earths by this process. To some extent, the permissible sulfate level and the pH at which the precipitation is to be made are interdependent. When the sulfate level is such that the molar ratio $SO_4/(U+Th)$ is not grater than approximately 1.5 substantially all the uranium and thorium may be precipitated at pH 3. At higher ratios uranium is increasingly lost through incomplete precipitation. However, this solubilizing effect of higher sulfate ratios may be offset by making the precipitation at high pH levels. For example, at a sulfate ratio of approximately 5 substantially complete precipitation of uranium and thorium is attained at a pH of approximately 5. In solutions more acid than approximately pH 3 substantial quantities of uranium and/or thorium remain in solution even at low sulfate levels. On the other hand precipitations made in solutions less acid than approximately pH 5 yield uranium-thorium fractions containing substantial amounts of rare earths.

When the feed concentrate contains excessive sulfate, the excess may be conveniently removed by precipitation as barium sulfate which may be either filtered off before proceeding or left and filtered off with the uranium-thorium precipitate. In the event that such a precipitation is found advisable it is preferably carried out in the absence of tetravalent uranium. The barium sulfate precipitate occludes significant amounts of tetravalent uranium, when present, but not hexavalent uranium.

Ammonia is the preferred precipitating agent for the thorium and uranium. Although other common bases, such as sodium or potassium hydroxide may be used, they possess no advantages over ammonia, and they may have certain disadvantages. For example, if the feed solution contains a substantial amount of sulfate, the use of sodium hydroxide to precipitate the uranium and thorium may also cause unwanted precipitation of rare earths as the slightly soluble sodium rare earth double sulfates. The corresponding double ammonium sulfates are more soluble.

The uranium and thorium values in the cake from the rare earth separation step are dissolved and the uranium is oxidized in preparation for its separation from thorium. The cake is slurried in hot water with sufficient hydrochloric acid to dissolve all the uranium values and sufficient oxidizing agent is added to oxidize all the uranium and substantially all the iron. Sufficient acid to render the pH at least as low as approximately 0.5 is normally required to dissolve the uranium values completely. A volume of the acid solvent sufficient to provide a uranium concentration in the range of approximately 50–150 g. $U_3O_8$/l. is used. It is not practical to work at uranium concentrations substantially higher than 150 g. $U_3O_8$/l. because the system tends to gel at such concentrations and is therefore difficult to handle. It is unnecessary to work at concentrations below approximately 50 g. $U_3O_8$/l. and it is disadvantageous to do so because of the unnecessarily large volumes of solution that must be handled. Moreover, such dilute solutions require the use of additional acid and oxidant. A concentration of approximately 100 g. $U_3O_8$/l. is preferred.

As an oxidant for the uranium and iron, sodium chlorate may be used advantageously, not only because it is inexpensive and readily available, but also because its reduction product, sodium chloride, introduces no new components into the solution that are likely to cause difficulty in subsequent operations. Potassium chlorate may also be used. Potassium permanganate may be used but it is more expensive than sodium chlorate and its use introduces substantial quantities of manganese, which is undesirable. Other oxidants, such as ammonium persulfate, may also be used but, as in the case of permanganate, the disadvantages associated with their use may outweigh any advantages they might otherwise possess.

When the initial concentrate is substantially free from rare earth values, the precipitation of crude tetravalent uranium and its subsequent reoxidation to hexavalent uranium may be eliminated. One may then proceed to separate thorium values from uranium values from an aqueous mixture or solution containing said values.

Uranium may be separated from a major portion of the thorium by carefully increasing the pH of such crude uranium-thorium mixtures or solutions. This thorium precipitation may be combined with a carbonate treatment when a higher grade uranium concentrate is desired. In the simplest case the thorium precipitation is made by carefully adding a base to the acidic thorium-hexavalent uranium solution until the proper pH value is reached. The preferred pH range for precipitation of the thorium is 3.4–3.5. In this range maximum precipitation of the thorium is attained with minimum precipitation of uranium. At pH values below 3.4 larger proportions of thorium are left in solution, although useful separations can be made at pH values down to about 3. When the pH value is increased above 3.5 by addition of a base to the acidic solution larger amounts of uranium precipitate and are not readily recovered. Useful separations can be made at pH values up to about 4. Although it is most convenient to precipitate the thorium by the addition of a solution of an alkali carbonate, such as sodium carbonate, the precipitation may also be made by the careful addition of other soluble bases, such as sodium, potassium, calcium, or ammonium hydroxide.

After selective precipitation of the major portion of the thorium by increasing the pH of the crude uranium-thorium mixture or solution, the uranium solution may be separated and the uranium recovered therefrom. However, if a higher grade uranium concentrate is desired, much of the dissolved thorium remaining in the solution may be precipitated by means of a carbonate treatment. It is known that both thorium and uranium form soluble complexes with excess alkali or ammonium carbonates. However it has now been found that when a portion of the thorium is first selectively precipitated, as previously described, and the slurry of thorium precipitate in the solution of hexavalent uranium is added to a solution containing an excess of alkali carbonate, the thorium precipitate, surprisingly, does not dissolve whereas the uranium remains in solution as sodium uranyl tricarbonate. Furthermore, when the slurry is digested any uranium values not in solution tend to be dissolved, and a substantial portion of the thorium remaining in solution from the previous step precipitates, thus improving the separation. In addition, extraneous metallic ions such as calcium, magnesium, aluminum, iron and rare earths precipitate as the carbonates or hydroxides.

The thorium precipitation and subsequent carbonate treatment are preferably carried out at an elevated temperature to establish equilibrium more rapidly. A temperature of approximately 80° C. is readily attained and is suitable for the purpose. Of course, lower temperatures may be used but digestion periods must then be extended to attain the same degree of uranium-thorium separation.

The carbonate treatment is carried out in a system that is approximately 0.05 to 0.1 molar, preferably approximately 0.075 molar, with respect to sodium uranyl tricarbonate and approximately 0.25 to 0.5, preferably approximately 0.4 molar, with respect to sodium carbonate.

Preferably the thorium is largely precipitated, as previously described, before the uranium-thorium system is added to the excess of sodium carbonate solution. Alternatively, a mixture containing uranium and thorium values such as, for example, the solution resulting from the acid oxidation step may be added directly to a solution containing an excess of sodium carbonate. The sodium carbonate should be present in an amount in excess of that required to convert all the uranium values to soluble sodium uranyl tricarbonate. In this situation useful separation of the thorium and uranium values is attained by a careful adjustment of pH of the carbonate solution. A solution of an alkali hydroxide (i.e., sodium or potassium hydroxide), preferably sodium hydroxide, is carefully added in increments until the desired pH has been attained. Precipitation of the ethorium becomes appreciable at an approximately pH 9.8 and increases rapidly at higher pH values. Concurrent loss of uranium is negligible up to a pH of approximately 10.2 but increases rapidly at higher pH values. This inter-relationship is illustrated in the drawing. Maximum separation of thorium with minimum loss of uranium is attained in the pH range 10.0–10.2.

The discovery described in the preceding paragraph is particularly useful when the preliminary thorium precipitation followed by the excess carbonate treatment still leaves an undesirably high proportion of thorium in solution. Such a situation occurs, for example, if insufficient care is used in making the preliminary pH adjustment. Additional thorium is then readily precipitated from the sodium uranyl tricarbonate-sodium carbonate solution with little loss of uranium by carefully increasing its pH to 10.0–10.2 by the careful addition of an alkali hydroxide.

The particular conditions that are selected for carrying out the thorium separations may be varied, depending upon the primary objective of the separation. In the preceding discussion, high recovery of uranium has been emphasized, with the occurrence of a moderate proportion of thorium in the uranium concentrate considered of secondary importance. When the process is operated with this objective the thorium is advantageously precipitated at relatively low pH values, for example at values below approximately 3.5 before the treatment with excess carbonate, or at values below approximately 10.2 in the presence of excess carbonate.

On the other hand, if the primary objective is a uranium concentrate substantially free from thorium then the thorium is advantageously precipitated at relatively higher pH values, for example, at values above approximately 3.5 up to approximately 4 before the treatment with excess carbonate or at values above approximately 10.2 up to approximately 11.2 in the presence of excess carbonate. Under these circumstances the primary yield of uranium concentrate will be lower, but the overall yield may be improved by recycling the thorium concentrate to recover the uranium values contained therein.

Although the composition of the uranium-thorium-rare earth concentrate initially charged into the process may vary considerably from batch to batch, it is easily to attain optimum conditions for carrying out the carbonate treatment because the major proportion of any extraneous materials whose presence might otherwise affect the carbonate treatment are removed in the earlier separations, particularly in the rare earth separation. This is important, because it permits the carbonate treatment to be carried out at sodium uranyl tricarbonate concentrations near the saturation point without causing precipitation of uranium.

Judicious recycling of filtrates and wash liquors permits operation of the process described with very small losses of the important metal values.

The methods described thus provide commercially useful mutual separation of uranium, thorium, and rare earth values, in a simple and efficient manner. All of the operations are carried out within temperature ranges and other operating conditions which permit the use of conventional and readily available equipment.

The following examples further illustrate the invention.

EXAMPLE 1

Euxenite ore was cracked by a treatment with caustic soda, and the acid soluble constituents were leached from the cracked ore with a hydrochloric-sulfuric acid solution as described in the aforesaid copending U.S. patent application. The acid solution (3590 gal.) contained 10.1 g. $U_3O_8$, approximately 2.5 g. $ThO_2$ and approximately 18 g. $RE_2O_3$ per liter. The solution was heated to 60° C., and 100 mesh iron powder was added in portions until the uranium was completely reduced. Excess iron powder (25 lbs.) was then added.

Ammonia solution was added to pH 4.0–4.5. The uranium remaining in solution was less than 0.05 g. $U_3O_8$/l. Iron powder (16 lbs.) was added, the slurry was filtered immediately and the crude uranium-thorium cake was washed.

The crude uranium-thorium cakes from this and a similar run were combined and slurried in water (250 gal.). The slurry was heated to 80° C. and hydrochloric acid was added to pH 0.4–0.5. Sodium chlorate was added in portions until a sample of the solution produced a light green color with potassium ferricyanide solution. After some dilution the uranium concentration in this solution was 83.4 g. $U_3O_8$/l.

A portion of this oxidized uranium solution (727 gal., containing 505 lbs. $U_3O_8$) was heated to 80° C. and diluted to 1500 gallons. Anhydrous sodium carbonate (2000 lbs.) was dissolved in water (2500 gal.) recovered from the washings of the thorium cake in a previous run. Thorium was then precipitated by adding the sodium carbonate solution slowly to the uranium solution with constant stirring until the pH was 3.4-3.5, the temperature being maintained at 80° C. Approximately 500 gallons of the sodium carbonate solution were required. The remainder of the sodium carbonate solution (approximately 2000 gal.) was heated to 80° C. and the thorium slurry was added during one hour. The slurry was stirred for an hour at 80° C., then filtered, and the cake was washed, the first washings being combined with the filtrate, the later washings being recycled to make up a batch of sodium carbonate solution for a subsequent run.

A 50% sodium hydroxide solution (approximately 700 lbs. NaOH) was added during 3 hours to the hot (80° C.) sodium uranyl tricarbonate-sodium carbonate solution (approximately 4500 gals.) until the resulting slurry contained 11-12 g. free NaOH per liter. The precipitated uranium values were filtered off and dried. The filtrate, containing less than 0.05 g. $U_3O_8$/l., was discarded.

When the process described was repeated successively over an extended period with judicious recycling of wash liquors the over-all yield of $U_3O_8$ recovered in the uranium concentrate was more than 97% of that charged into the process during the same period.

The compositions of typical thorium and uranium concentrates produced by the process described in this example are shown in Table II.

TABLE II

*Composition of Typical Thorium and Uranium Concentrates Produced by Process of Example 1*

| Component | Thorium Concentrate (Ignited Basis) | Uranium Concentrate (Dried) |
|---|---|---|
|  | Percent | Percent |
| $U_3O_8$ | 1 | [1] 79.2 |
| $ThO_2$ | 16 | [2] 4.5 |
| $RE_2O_3$ | 9 |  |
| $SO_4$ | 24 | 0.1 |
| $Al_2O_3$ | 37 |  |
| $Fe_2O_3$ | 13 |  |
| $P_2O_5$ |  | 0.05 |

[1] Equivalent to 89.4% $Na_2U_2O_7$.
[2] Includes small proportion of $RE_2O_3$.

EXAMPLE 2

A hydrochloric-sulfuric acid solution (35 gal.) derived from the acid leaching of caustic cracked euxenite was heated to 60° C. To this was added a solution of barium chloride (1.42 lb. $BaCl_2 \cdot 2H_2O$), sufficient to decrease the molar ratio $SO_4/(U+Th)$ in the solution to 0.75.

Iron powder (100 mesh, 116 oz.) was added in two portions during 1 hour's stirring. At the end of this time all the hexavalent uranium and trivalent iron had been reduced. More iron powder (2.5 oz.—0.5 g./l.) was added to protect the uranium against air oxidation.

Ammonia solution was added in portions until the pH increased to 3.1 (uranium precipitation complete) and iron (2.5 oz.) was added. The slurry was filtered and washed, the first washings being combined with the mother liquor. Analyses of the products are shown in Table III.

TABLE III

| Constituent | Crude Uranium Cake | | Mother Liquor | |
|---|---|---|---|---|
|  | Percent | lbs. | g./l. | lbs. |
| Uranium (as $U_3O_8$) | 25.8 | 3.81 | 0.08 | 0.03 |
| Iron (as $Fe_2O_3$) | 2.66 | 0.39 | 13.0 | 4.70 |
| Thorium (as $ThO_2$) | 4.1 | 0.61 | 0.5 | 0.18 |
| Rare Earths (as $RE_2O_3$) | 0.51 | 0.07 | 21.2 | 7.69 |

EXAMPLE 3

An acidic thorium-hexavalent uranium solution (1 liter containing approximately 50 g. $U_3O_8$ and approximately 10 g. $ThO_2$) such as that produced by a method generally similar to that described in the first three paragraphs of Example 1 was heated to 80° C. and 2 molar sodium carbonate solution was added until the pH rose to 3.4. A small sample was filtered and the filtrate was analyzed. The remaining slurry was stirred into a solution of sodium carbonate (163 g. $Na_2CO_3$ in 1.5 liters). After standing overnight the slurry was heated to 80° C., digested for one hour and filtered. The cake was washed four times with water. Analytical data are shown in Table IV.

EXAMPLE 4

Example 3 was repeated with the variation that the pH was adjusted to 3.5 by the addition of sodium hydroxide solution.

See Table IV for analytical data.

EXAMPLE 5

Example 4 was repeated with the variation that the pH adjustment was made to 4.0 with sodium hydroxide solution.

See Table IV for analytical data.

TABLE IV

*Summary of Data, Examples 3–5*

| Example | Filtrate After Thorium Precipitation | | Filtrate After Carbonate Leach | Cake after Carbonate Leach | |
|---|---|---|---|---|---|
|  | pH | $ThO_2/U_3O_8$ | $ThO_2/U_3O_8$ | Percent $U_3O_8$ in cake | Percent of Total $U_3O_8$ in cake |
| 3 | 3.4 | 0.10 | 0.065 | 0.86 | 0.67 |
| 4 | 3.5 | 0.06 | 0.03 | 0.32 | 0.15 |
| 5 | 4.0 | 0.00 | 0.00 | 5.01 | 2.8 |

The ratios $ThO_2/U_3O_8$ as used herein are by weight.

EXAMPLE 6

A crude uranium-thorium solution (1.2 liters, containing 86 g. $U_3O_8$) such as that prepared by a process generally similar to that described in the first three paragraphs of Example 1 was heated to 80° C., which temperature was maintained through all succeeding operations. This solution was added during 1 hour 20 minutes to a solution of sodium carbonate (1.8 liters containing 230 g. $Na_2CO_3$). This suspension was digested an hour and a sample was removed for analysis. A 5% sodium hydroxide solution was then added in 50 ml. portions. After each addition the mixture was digested 20 minutes and a sample taken for analysis. The samples were analyzed by filtering off the thorium-uranium precipitate, determining the $U_3O_8$ content thereof, and determining the pH of the filtrate and the $ThO_2/U_3O_8$ ratio therein. The drawing portrays the changes in the system with increasing pH.

EXAMPLE 7

An acidic thorium-hexavalent uranium solution from the same source as that used in Examples 3–5 (1 liter containing approximately 50 g. $U_3O_8$; $ThO_2/U_3O_8$ approximately 0.2) was added to a hot (80° C.) solution of sodium carbonate (1.5 liters containing 187 g. $Na_2CO_3$) during 30 minutes. The resulting slurry was digested at 80° C. for an hour and filtered, and the cake was washed. The cake contained 0.115 g. $U_3O_8$ (0.23% of $U_3O_8$ charged into process). The ratio $ThO_2/U_3O_8$ in the filtrate was 0.12; and the pH thereof was 9.44.

A 25% sodium hydroxide solution (18.5 ml.) was added to a hot (80° C.) portion of the above filtrate (1 liter) during 30 minutes. The resulting slurry was digested an additional 30 minutes, filtered and the cake was washed. The cake contained 0.004 g. $U_3O_8$ (0.017% of that in the feed solution) and the filtrate had a pH of 10.6.

Sodium hydroxide solution was added in excess to the filtrate from the previous step and the precipitated uranium values were filtered off and dried. The ratio $ThO_2/U_3O_8$ in the uranium concentrate was approximately 0.008.

EXAMPLE 8

A 25% sodium hydroxide solution (25 ml.) was slowly added to a hot (80° C.) portion of the filtrate (1 liter) formed in the first paragraph of Example 7. The resulting slurry was digested and filtered and the cake was washed. This thorium cake contained 3.8 g. $U_3O_8$ (15% of that in the feed solution). The pH of the filtrate was 11.2.

Sodium hydroxide solution was added in excess to the filtrate from the previous step and the precipitated uranium values were filtered off and dried. The thorium content of the uranium concentrate was negligible.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

We claim:

1. The method which comprises treating an acidic solution comprising uranium, thorium and rare earth values, together with not more than a minor proportion of phosphate values, with a reducing agent to reduce substantially all the uranium values to a tetravalent state, increasing the pH of said solution to a value of between approximately 3 to 5 to precipitate substantially all of the uranium values and a major portion of the thorium values, separating said precipitate of the uranium and thorium values, forming an aqueous slurry of said precipitate with an acid and an oxidant to reconvert said uranium values to a hexavalent state and thereby redissolve said uranium values, the resulting mixture having a concentration of between approximately 50 and 150 g. $U_3O_8$ per liter, increasing the pH of said mixture to a level not substantially less than a pH of approximately 3 to precipitate thorium values selectively, and separating said precipitated thorium values from the solution containing said uranium values.

2. The method which comprises intermixing an acidic solution comprising uranium, thorium and rare earth values, together with not more than a minor proportion of phosphate values, with iron powder in an amount slightly in excess of that required to reduce substantially all the uranium values to a tetravalent state, increasing the pH of said solution to a value of approximately 4 by addition of ammonium hydroxide to precipitate substantially all of the uranium values and a major portion of the thorium values, separating said precipitate of the uranium and thorium values by filtration, forming an aqueous slurry of said precipitate with hydrochloric acid and sodium chlorate at a temperature of approximately 80° C., and at a pH of approximately 0.4 to 0.5 to reconvert said uranium values to a hexavalent state and thereby redissolve said uranium values, the resulting mixture having a concentration of between approximately 50 and 150 g. $U_3O_8$ per liter, increasing the pH of said mixture to approximately 3.4 to 3.5 to form a mixture including precipitated thorium values, adding said mixture to an aqueous solution containing sodium carbonate in an amount in excess of that required to convert all the uranium values to sodium uranyl tricarbonate to further improve the separation of uranium and thorium values, separating said precipitated thorium values from the solution containing said uranium values, and adding sodium hydroxide to the remaining solution to precipitate uranium values therefrom.

3. The method which comprises intermixing an acidic solution comprising uranium, thorium and rare earth values, together with not more than a minor proportion of phosphate values, with iron powder in an amount slightly in excess of that required to reduce substantially all the uranium values to a tetravalent state, increasing the pH of said solution to a value of approximately 4 by addition of ammonium hydroxide to precipitate substantially all of the uranium values and a major portion of the thorium values, separating said precipitate of the uranium and thorium values by filtration, forming an aqueous slurry of said precipitate with hydrochloric acid and sodium chlorate at a temperature of approximately 80° C. and at a pH of approximately 0.4 to 0.5 to reconvert said uranium values to a hexavalent state and thereby redissolve said uranium values, the resulting mixture having a concentration of between approximately 50 and 150 g. $U_3O_8$ per liter, increasing the pH of said mixture to approximately 3.4 to 3.5 to form a mixture including precipitated thorium values, adding said mixture to an aqueous solution containing sodium carbonate in an amount in excess of that required to convert all the uranium values to sodium uranyl tricarbonate to form a mixture having a concentration between approximately 0.05 to 0.1 molar with respect to sodium uranyl tricarbonate and between approximately 0.25 to 0.5 molar with respect to sodium carbonate and thereby further improve the separation of uranium and thorium values, separating said precipitated thorium values from the solution containing said uranium values, and adding sodium hydroxide to the remaining solution to precipitate uranium values therefrom.

4. The method which comprises intermixing an acidic solution comprising uranium, thorium and rare earth values, together with not more than a minor proportion of phosphate values, with iron powder in an amount slightly in excess of that required to reduce substantially all the uranium values to a tetravalent state, increasing the pH of said solution to a value of approximately 4 by addition of ammonium hydroxide to precipitate substantially all of the uranium values and a major portion of the thorium values, separating said precipitate of the uranium and thorium values by filtration, forming an aqueous slurry of said precipitate with hydrochloric acid and sodium chlorate at a temperature of approximately 80° C. and at a pH of approximately 0.4 to 0.5 to reconvert said uranium values to a hexavalent state and thereby redissolve said uranium values, the resulting mixture having a concentration of approximately 100 g. $U_3O_8$ per liter, increasing the pH of said solution to approximately 3.4 to 3.5 to form a mixture including precipitated thorium values, adding said mixture to an aqueous solution containing sodium carbonate in an amount in excess of that required to convert all the uranium values to sodium uranyl tricarbonate to form a mixture having a concentration of approximately 0.075 molar with respect to sodium uranyl tricarbonate and approximately 0.4 molar with respect to sodium carbonate and thereby further improve the separation of uranium and thorium values, separating said precipitated thorium values from the solution containing said uranium values, and adding sodium hydroxide to the remaining solution to precipitate uranium values therefrom.

5. The method which comprises adding an aqueous acid mixture comprising uranium and thorium values, substantially all of said uranium values being present in the hexavalent state, together with not more than minor proportions of phosphate and rare earth values, to an aqueous solution containing an alkali carbonate in an amount in excess of that required to convert all the uranium values to soluble alkali uranyl tricarbonate, adding an alkali hydroxide to selectively precipitate thorium values, and separating said precipitated thorium values from the solution containing said uranium values.

6. The method which comprises adding an aqueous acid mixture comprising uranium and thorium values, substantially all of said uranium values being present in the hexavalent state, together with not more than minor proportions of phosphate and rare earth values, to an aqueous solution containing an alkali carbonate in an amount in excess of that required to convert all the uranium values to soluble alkali uranyl tricarbonate, to form a mixture having a pH between approximately 9.8 and 11.2 to precipitate thorium values, and separating said precipitated thorium values from the solution containing said uranium values.

7. The method which comprises adding an aqueous acid mixture comprising uranium and thorium values, substantially all of said uranium values being present in the hexavalent state, together with not more than minor proportions of phosphate and rare earth values, to an aqueous solution containing an alkali carbonate in an amount in excess of that required to convert all the uranium values to soluble alkali uranyl tricarbonate, adding an alkali hydroxide to increase the pH to between approximately 9.8 and 11.2 to precipitate thorium values, and separating said precipitated thorium values from the solution containing said uranium values.

8. The method which comprises increasing the pH of an aqueous acid solution containing uranium and thorium values, substantially all of said uranium values being present in the hexavalent state, together with not more than minor proportions of phosphate and rare earth values, to about 3 to 4 to form a mixture including precipitated thorium values, adding said mixture to an aqueous solution containing an alkali carbonate in an amount in excess of that required to convert all the uranium values to soluble alkali uranyl tricarbonate to improve the separation of uranium and thorium values, and separating said precipitated thorium values from the solution containing said uranium values.

9. The method which comprises increasing the pH of an aqueous acid solution containing uranium and thorium values, substantially all of said uranium values being present in the hexavalent state, together with not more than minor proportions of phosphate and rare earth values, to about 3 to 4 to form a mixture including precipitated thorium values, adding said mixture to an aqueous solution containing an alkali carbonate in an amount in excess of that required to convert all the uranium values to soluble alkali uranyl tricarbonate, adding an alkali hydroxide to increase the pH to between approximately 9.8 and 11.2 to improve the separation of uranium and thorium values, and separating said precipitated thorium values from the solution containing said uranium values.

10. The method which comprises treating an aqueous acidic solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, thereby obtaining an aqueous acid solution containing uranium and thorium values substantially free from rare earth values.

11. The method which comprises treating an aqueous acid solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, adding said aqueous acid mixture to an aqueous solution containing an alkali carbonate in an amount in excess of that required to convert all the uranium values to soluble alkali uranyl tricarbonate, adding an alkali hydroxide to selectively precipitate thorium values, and separating said precipitated thorium values from the solution containing said uranium values.

12. The method which comprises treating an aqueous acid solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, adding said aqueous acid mixture to an aqueous solution containing an alkali carbonate in an amount in excess of that required to convert all the uranium values to soluble alkali uranyl tricarbonate, to form a mixture having a pH between approximately 9.8 and 11.2 to precipitate thorium values, and separating said precipitated thorium values from the solution containing said uranium values.

13. The method which comprises treating an aqueous acid solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, adding said aqueous acid mixture to an aqueous solution containing an alkali carbonate in an amount in excess of that required to convert all the uranium values to soluble alkali uranyl tricarbonate, adding an alkali hydroxide to increase the pH to between 9.8 and 11.2 to precipitate thorium values, and separating said precipitated thorium values from the solution containing said uranium values.

14. The method which comprises treating an aqueous acid solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, increasing the pH of said acqueous acid solution to about 3 to 4 to form a mixture including precipitated thorium values, adding said mixture to an aqueous solution containing an alkali carbonate in an amount in excess of that required to convert all the uranium values to soluble alkali uranyl tricarbonate to improve the separation of uranium and thorium values, and separating said precipitated thorium values from the solution containing said uranium values.

15. The method which comprises treating an aqueous acid solution comprising uranium, thorium and rare earth values, together with not more than a minor proportion of phosphate values, with a reducing agent to reduce substantially all the uranium values to a tetravalent state, increasing the pH of said solution to precipitate substantially all the uranium values and a major portion of the thorium values, separating said precipitate of the uranium and thorium values, treating said precipitate with an acid and an oxidant to reconvert said uranium values to a hexavalent state and redissolve said uranium values, increasing the pH of said aqueous acid solution to about 3 to 4 to form a mixture including precipitated thorium values, adding said mixture to an aqueous solution containing an alkali carbonate in an amount in excess of that required to convert all the uranium values to soluble alkali uranyl tricarbonate, adding an alkali hydroxide to increase the pH to between approximately 9.8 and 11.2 to improve the separation of uranium and thorium values, and separating said precipitated thorium values from the solution containing said uranium values.

References Cited in the file of this patent

UNITED STATES PATENTS

| | | |
|---|---|---|
| 1,368,243 | Davis | Feb. 15, 1921 |
| 2,761,758 | Long et al. | Sept. 4, 1956 |
| 2,767,045 | McCullough | Oct. 16, 1956 |
| 2,905,524 | Mahut | Sept. 22, 1959 |

OTHER REFERENCES

Shaw et al.: A Process for Separating Thorium Compounds from Monazite Sands, ISC-407, January 1954, pp. 8-13.

Britton: "Hydrogen Ions," 1929, pp. 252-254, 273-278, 281, D. Van Nostrand Co., New York.

Bearse et al.: Chem. Eng. Prog., vol. 50, No. 5, pp. 235-239, May 1954.